(12) United States Patent
Kaneshige et al.

(10) Patent No.: US 7,888,827 B2
(45) Date of Patent: Feb. 15, 2011

(54) LINEAR SYNCHRONOUS MOTOR AND LINEAR MOTOR ACTUATOR

(75) Inventors: Hiroshi Kaneshige, Tokyo (JP); Taro Miyamoto, Tokyo (JP); Akihiro Unno, Tokyo (JP)

(73) Assignee: THK Co., Ltd., Tokyo (JP)

( * ) Notice: Subject to any disclaimer, the term of this patent is extended or adjusted under 35 U.S.C. 154(b) by 88 days.

(21) Appl. No.: 12/088,829

(22) PCT Filed: Sep. 5, 2006

(86) PCT No.: PCT/JP2006/317520

§ 371 (c)(1),
(2), (4) Date: Nov. 14, 2008

(87) PCT Pub. No.: WO2007/040009

PCT Pub. Date: Apr. 12, 2007

(65) Prior Publication Data

US 2009/0127939 A1     May 21, 2009

(30) Foreign Application Priority Data

Sep. 30, 2005    (JP) ............................. 2005-288030

(51) Int. Cl.
*H02K 41/02* (2006.01)
(52) U.S. Cl. .................. 310/12.21; 310/12.26
(58) Field of Classification Search ... 310/12.21–12.22, 310/12.24–12.26, 13–14
See application file for complete search history.

(56) References Cited

U.S. PATENT DOCUMENTS 4,665,329 A * 5/1987 Raschbichler ................ 310/13

(Continued)

FOREIGN PATENT DOCUMENTS

JP    3-270670 A    12/1991

(Continued)

OTHER PUBLICATIONS

International Search Report of PCT/JP2006/317520, date of mailing Dec. 5, 2006.

*Primary Examiner*—Thanh Lam
(74) *Attorney, Agent, or Firm*—Westerman, Hattori, Daniels & Adrian, LLP (57) ABSTRACT

Provided is a linear synchronous motor in which, when a three-phase alternating current passes through a coil of a mover, thrust forces generated by the alternating currents of each phase are equalized, thereby making it possible to minimize variation in thrust force, the linear synchronous motor including: a stator magnet (4) in which N poles and S poles are alternately arranged linearly; and a mover (5) which is opposed to the stator magnet (4) at an interval therefrom, and which generates a shifting magnetic field along with passage of a three-phase alternating current, for applying a thrust force to the stator magnet (4), in which: the mover (5) includes a core member (50) in which teeth (52), the number of which is a whole-number multiple of a number of phases of the alternating currents, are arranged, and a coil (51) which is wound around the teeth (52) and through which the alternating current of any one of the phases passes; and of the plurality of teeth (52) provided to the core member (50), the teeth (52) corresponding to a u phase and a w phase of the alternating currents passing through the coil (51) wound around the teeth (52) at both ends of the core member (50) have distal ends protruding toward the stator magnet (4) further than distal ends of the residual teeth (52).

3 Claims, 7 Drawing Sheets

U.S. PATENT DOCUMENTS

| | | | |
|---|---|---|---|
| 4,728,382 A * | 3/1988 | Raschbichler | 156/264 |
| 6,879,066 B2 * | 4/2005 | Hashimoto et al. | 310/12.24 |
| 7,199,492 B2 * | 4/2007 | Hashimoto et al. | 310/12.25 |
| 7,224,089 B2 * | 5/2007 | Morel | 310/12.01 |
| 7,456,526 B2 * | 11/2008 | Teramachi et al. | 310/12.21 |
| 2004/0256919 A1 * | 12/2004 | Hashimoto et al. | 310/12 |
| 2006/0125326 A1 * | 6/2006 | Baccini | 310/12 |
| 2006/0232141 A1 * | 10/2006 | Teramachi et al. | 310/12 |

FOREIGN PATENT DOCUMENTS

| | | |
|---|---|---|
| JP | 07-99767 A | 4/1995 |
| JP | 7-99767 A | 4/1995 |
| JP | 08-205514 A | 8/1996 |
| JP | 10-290560 A | 10/1998 |
| JP | 2002-374665 A | 12/2002 |
| JP | 2003-070226 A | 3/2003 |

* cited by examiner

LINEAR SYNCHRONOUS MOTOR AND LINEAR MOTOR ACTUATOR

TECHNICAL FIELD

The present invention relates to a linear motor, which is used as a drive means of a linear guide portion of a general conveyor machine, or a machine tool, for example, for applying a thrust force or a brake force to a movable body guided linearly, and more particularly, to improvement of a linear synchronous motor, which allows an alternating current to pass through a coil wound around a core member, and uses as the thrust force a magnetic attractive force generated between the core member and a magnet.

BACKGROUND ART

In a general conveyor machine or a machine tool, as means for reciprocatingly and linearly move a movable body such as a table, there is known a so-called linear motor actuator using a linear motor as a thrust force generation source. As the most general linear motor actuator, there is known one in which the movable body is supported by using a pair of linear guides on a stationary portion such as a bed or a column so as to be reciprocatingly movable, and a stator and a movable element constituting the linear motor are mounted so as to oppose to each other onto the stationary portion and the movable body, respectively (JP 10-290560 A or the like). Specifically, while track rails of the linear guides are arranged on the stationary portion and the stator of the linear motor is mounted thereonto in parallel to the track rails, sliders of the linear guides and a mover of the linear motor are mounted onto the movable body and the sliders on the movable body side are assembled to the track rail. As a result, the movable body is supported so as to be reciprocatingly movable on the stationary portion, and the stator on the stationary portion side and the mover on the movable body side are opposed to each other.

As the linear motor, there exist those of various types based on differences in their drive systems. As a representative one, there is provided the so-called linear synchronous motor, in which alternating currents of a plurality of phases pass through a coil to be used (JP 2003-070226 A, JP 08-205514 A, and the like). The linear synchronous motor includes a stator magnet having N poles and S poles alternately linearly arranged to generate a magnetic field, and a mover for generating a shifting magnetic field along an arrangement direction of the magnetic poles of the stator magnet by virtue of passage of the alternating current. Between the shifting magnetic field generated by the mover and the magnetic field generated by the stator magnet, a magnetic attractive force or a magnetic repulsive force is generated. As a result, a thrust force for relatively moving the mover and the stator magnet is generated.

There are two types of movers including and not including a core member made of a ferromagnetic material such as iron. The former type is advantageous in terms of an amount of thrust force to be generated. To the core member, teeth, the number of which is a whole-number multiple of the number of phases of the alternating current, are provided so as to oppose to the stator magnet. The coil is wound around those teeth. When the coil is electrified, each of the teeth becomes an electromagnet, and between the coil and the respective magnetic poles each constituting the stator magnet, the magnetic attractive force or the magnetic repulsive force is generated. For example, a three-phase alternating current is formed of three alternating currents consisting of a u phase, a v phase, and a w phase, having a phase difference of 120 degrees to each other. Accordingly, if the alternating currents having the phase difference of 120 degrees to each other are allowed to successively pass through the coil wound around a series of the teeth, in such a manner that the u-phase is at one end of the core member, the v-phase is at the next tooth, and the w-phase is at the tooth next to the next tooth, there occurs a phenomenon as if the magnetic field moves from the tooth positioned at one end of the core member toward the tooth positioned at the other end thereof. This is the above-mentioned shifting magnetic field. Owing to cooperation between the shifting magnetic field and the stator magnet, the thrust force acts between the mover and the stator magnet.

Patent Document 1: JP 10-290560 A
Patent Document 2: JP 2003-070226 A
Patent Document 3: JP 08-205514 A

DISCLOSURE OF THE INVENTION

Problems to be Solved by the Invention

Here, a magnitude of the magnetic attractive force acting between the teeth of the core member and the magnetic poles of the stator magnet differs depending on densities of magnetic fluxes passing through the teeth. The higher the magnetic flux density is, the larger the magnetic attractive force becomes. Therefore, essentially, in a case where the densities of the magnetic fluxes passing through the teeth of the core member are equal to each other, when the u-phase, v-phase, and w-phase alternating currents differing in phase pass through a series of teeth, a uniform thrust force must be generated.

However, regarding the two teeth positioned at both ends of the core member, only one side of each of the teeth is adjacent to another tooth and both sides thereof are not adjacent to other teeth, so the densities of the magnetic fluxes passing through those two teeth tend to be lower than the densities of the other magnetic fluxes passing through the other teeth. Therefore, in a case where, of the u phase, the v phase, and the w phase constituting the three-phase alternating current, the u phase is allowed to correspond to the tooth at one end of the core member and the w phase is allowed to correspond to the tooth at the other end of the core member, there is a problem in that, when the thrust force is generated by allowing the three-phase alternating current to pass through the coil wound around the teeth in the above-mentioned manner, the thrust force generated by the alternating current of the v phase is slightly stronger than the thrust force generated by the alternating currents of the U phase and the w phase, and periodical variation is caused in thrust force.

Further, since the density of magnetic flux flowing the two teeth positioned at both ends of the core member are lower than that of the magnetic flux flowing the other teeth, when the core member made of a ferromagnetic material is moved relative to the stator magnet, a cogging torque is locally varied. This also leads to a problem in that the thrust force between the mover and the stator magnet is varied.

Conventionally, for the above-mentioned problem of the variation in thrust force, there is taken a countermeasure such as a change of an arrangement pitch of the teeth or a change of a tooth thickness or a tooth width. However, the above-mentioned countermeasures lead to reduction of a slot space (space between two teeth adjacent to each other) for accommodating the coil or the like. There is also a problem in that, due to reduction in winding number of the coil, great reduction in thrust force tends to occur.

Means for Solving the Problems

The present invention has been made in view of the above-mentioned problems. It is an object of the present invention to provide a linear synchronous motor in which when alternating currents of a plurality of phases pass through a coil of a mover, thrust forces generated by the alternating currents of each phase are equalized, thereby making it possible to minimize variation in thrust force.

A linear synchronous motor according to the present invention achieving the above-mentioned object includes: a first member including N poles and S poles alternately linearly arranged to generate a magnetic field; and a second member which is opposed to the first member at an interval therefrom, and which generates a shifting magnetic field along an arrangement direction of the magnetic poles along with passage of alternating currents of a plurality of phases, for applying a thrust force to the first member. Further, the second member includes a core member in which teeth, the number of which is a whole-number multiple of a number of phases of the alternating currents, are arranged, and a coil which is wound around the teeth of the core member and through which the alternating current of any one of the phases passes. Of the plurality of teeth provided to the core member, at least one of the teeth corresponding to the phases of the alternating currents passing through the coil wound around the teeth at both ends of the core member has a distal end protruding toward the first member further than distal ends of the residual teeth.

For example, when a description is made by taking a three-phase alternating current (u phase, v phase, and w phase) as an example, through the coil wound around the tooth at one end of the core member, the u-phase alternating current passes, and through the coil wound around the tooth at the other end, the w-phase alternating current passes. In this case, the distal ends of the teeth around which the v-phase coil is wound are spaced apart from the first member further than the distal ends of the teeth around which the coil of the u phase and the w phase is wound, the distal ends of the teeth around which the coil of the u phase and the w phase is wound protruding toward the first member further than the distal ends of the teeth around which the coil of the v phase is wound.

With this structure, in a case where one or a plurality of teeth corresponding to the u phase, one or a plurality of teeth corresponding to the v phase, and one or a plurality of teeth corresponding to the w phase are assumed to form groups, respectively, magnetic flux densities of the groups can be equalized. Accordingly, the variation in thrust force when the alternating current passes through can be minimized. Further, it is also possible to suppress local variation in cogging torque caused when the second member onto which the core member is mounted is moved relative to the first member. In view of this, the variation in thrust force can also be minimized.

Further, the first member can be the stator or the mover. When the first member is the stator, the second member is the mover. Alternatively, when the first member is the mover, the second member is the stator. As a matter of course, the second member includes a coil to generate the shifting magnetic field. Accordingly, when the second member is the stator, the core member and coil members has to be provided over a stroke range of the first member which is the stator, thereby making assembly of the second member cumbersome. Therefore, in view of facilitating the assembly of the second member, it is preferable that the first member be the stator.

DESCRIPTION OF SYMBOLS

1 . . . track rail, 2 . . . movable body, 3 . . . table structural body, 3a, 3b . . . slider, 3c . . . joint top plate, 4 . . . stator magnet, 5 . . . mover, 10 . . . stationary base, 11 . . . side wall portion, 30 . . . bearing portion, 31 . . . top plate portion, 50 . . . core member, 51 . . . coil, 52 . . . teeth.

BEST MODES FOR CARRYING OUT THE INVENTION

Hereinafter, a detailed description will be made of a linear synchronous motor of the present invention with reference to the attached drawings.

Figure 1:
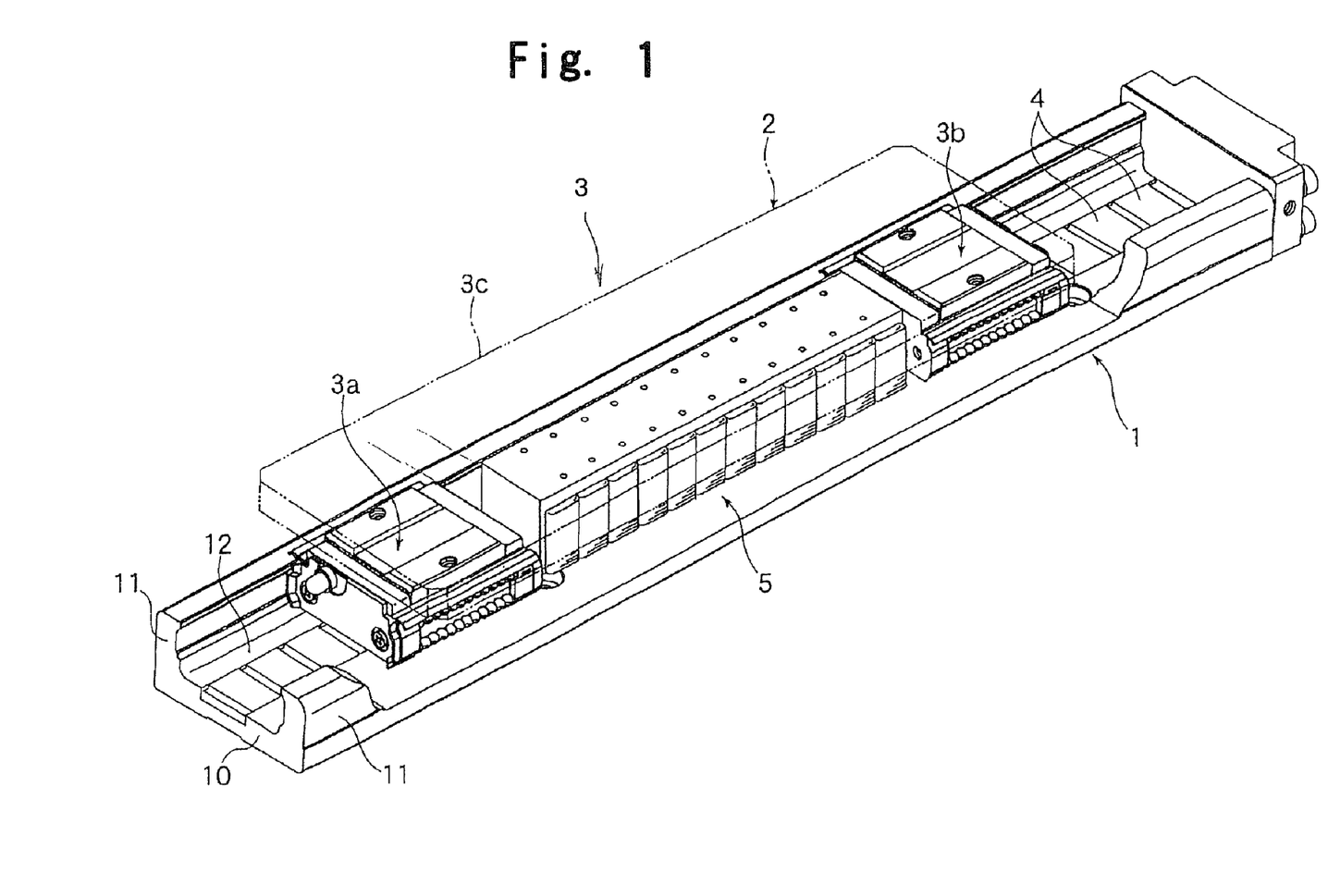
FIG. 1 is a perspective view showing a linear motor actuator according to a first embodiment of the present invention, to which a linear synchronous motor of the present invention is applied.

FIG. 1 shows an example of a linear motor actuator to which the linear synchronous motor of the present invention is mounted. The linear motor actuator includes a track rail 1 formed in a channel-like shape, a table structural body 3 onto which a movable body to be controlled is mounted and which is movable along the track rail 1, stator magnets 4 arranged on the track rail 1, and a mover 5 mounted onto the table structural body 3 and constituting, together with the stator magnets 4, the linear synchronous motor. By magnetizing a coil of the mover 5 mounted onto the table structural body 3, the table structural body 3 can be allowed to thrust along the track rail 1 and can be stopped at a predetermined position.

The track rail 1 has a stationary base 10 mounted onto a stationary portion such as a bed by a bolt (not shown) and a pair of side wall portions 11 and 11 extending upright from the stationary base 10. A space surrounded by the stationary base 10 and the side wall portions 11 is a guide path 12 of a concave groove shape. The table structural body 3 reciprocatingly moves along the guide path 12. Further, in each of inner surfaces of the side wall portions 11 facing the guide path 12, there are formed two ball rolling grooves 13 on upper and lower sides. The ball rolling grooves 13 are formed along a longitudinal direction of the track rail 1.

On the other hand, the table structural body 3 includes a pair of sliders 3a and 3b arranged in the guide path of the track rail and reciprocatingly movable in the guide path, and a joint top plate 3c for connecting the sliders 3a and 3b to each other at a predetermined interval. The joint top plate 3c is formed in a substantially rectangular shape in which long sides thereof coincide with the longitudinal direction of the track rail 1. To both end portions in the longitudinal direction, the sliders 3a and 3b positioned in the guide path 12 of the track rail 1 are fixed, respectively, with the joint top plate 3c itself being mounted onto the sliders 3a and 3b to be positioned outside the guide path 12 of the track rail 1. Further, between the pair of sliders 3a and 3b fixed to the joint top plate 3c, there is provided the mover 5. The mover 5 is suspended from the joint top plate 3c and is positioned in the guide path 12 of the track rail 1.

Figure 2:
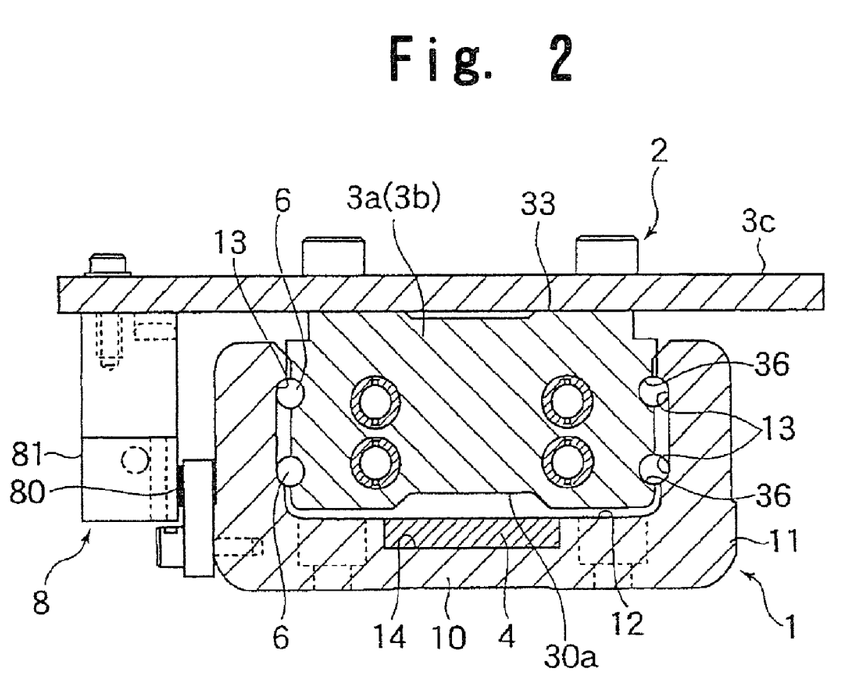
FIG. 2 is a vertical sectional view of the linear motor actuator shown in FIG. 1, which is taken along a direction perpendicular to a longitudinal direction of a track rail.

FIG. 2 is a sectional view of the track rail 1 and the slider 3a, 3b. The slider 3a, 3b is formed in a substantially rectangular shape and is arranged in the guide path 12 of the track rail 1. At least apart of the slider 3a, 3b protrudes to the outside of the guide path 12 of the track rail 1. A top of the slider 3a, 3b, positioned above an upper end of the side wall portion 11 of the track rail 1, is formed with a mounting surface 33. The slider 3a, 3b includes endless circuits, in which balls 6 circulate, in two rows on each of right and left sides, that is, four rows in total. The endless circuits correspond to the ball rolling grooves 13, respectively, formed in the side wall portions 11 of the track rail 1.

Figure 3:
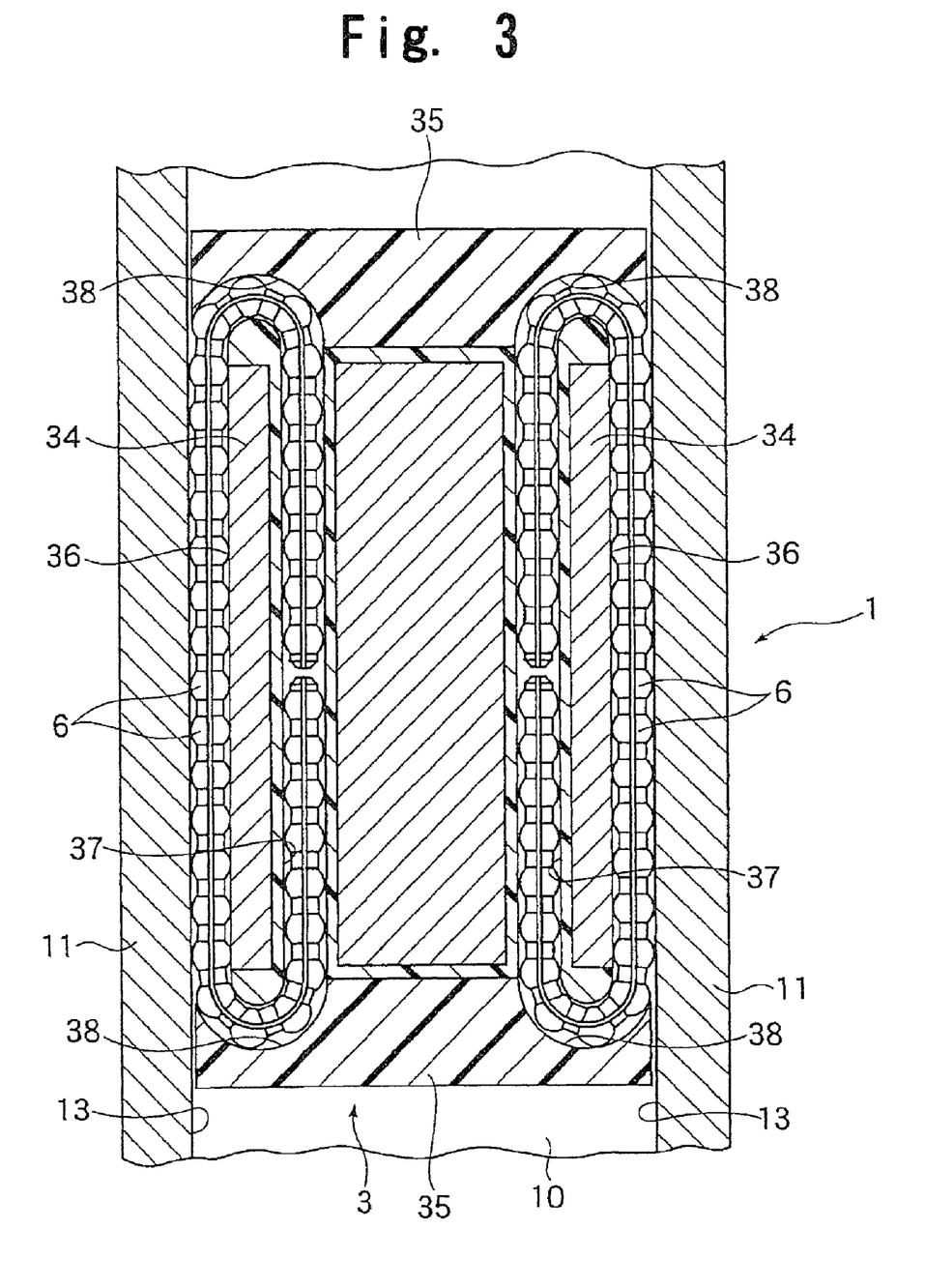
FIG. 3 is a plan sectional view showing ball endless circuits of the linear motor actuator shown in FIG. 1.

FIG. 3 is a plan view showing the ball endless circuits of the slider. The slider 3a, 3b includes a bearing race 34 formed of a metal block, and a pair of end caps 35 made of a synthetic resin, which are fixed to both front and back end surfaces of the bearing race 34 with respect to a moving direction of the sliders 3. Each of the endless circuits includes a load rolling groove 36 formed on an outer surface of the bearing race 34, a ball returning hole 37 formed in the bearing race 34 so as to be parallel to the load rolling groove 36, and U-shaped direction conversion paths 38 formed in the end caps 35. The large number of balls 6 roll between the ball rolling groove 13 of the track rail 1 and the load rolling groove 36 of the bearing race 34 while being applied with a load. Further, the balls 6, which have completed rolling in the load rolling groove 36, enter the direction conversion path 38 on the one end cap 35 to be released from the load, then roll in the ball returning hole 37 in a non-load state, and further roll in the direction conversion path 38 on the other end cap 35, thereby circulating into the load rolling groove 36 of the bearing race 34 again. Note that, when the balls 6 in the non-load state roll in the ball returning hole 37, an inner peripheral surface of the ball returning hole 37 and the balls 6 are brought into contact with each other, to thereby generate a noise. Accordingly, the inner peripheral surface of the ball returning hole 37 is covered with a synthetic resin.

Figure 4:
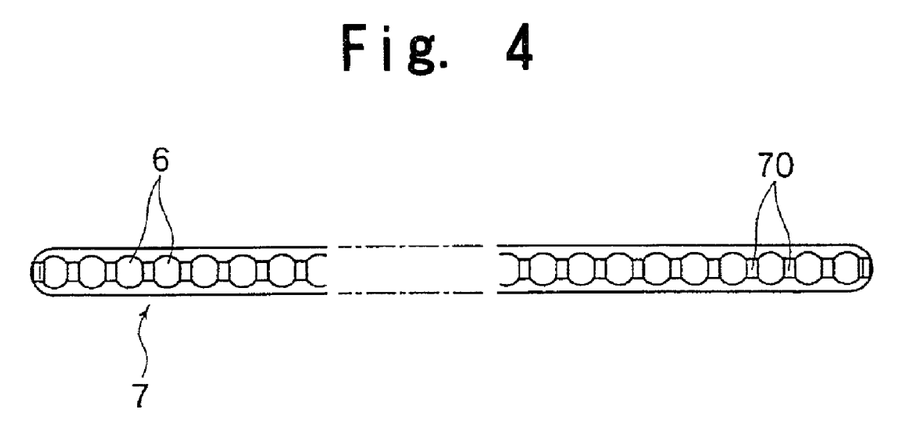
FIG. 4. is a plan view showing a spacer belt used for the linear motor actuator shown in FIG. 1.
Figure 5:
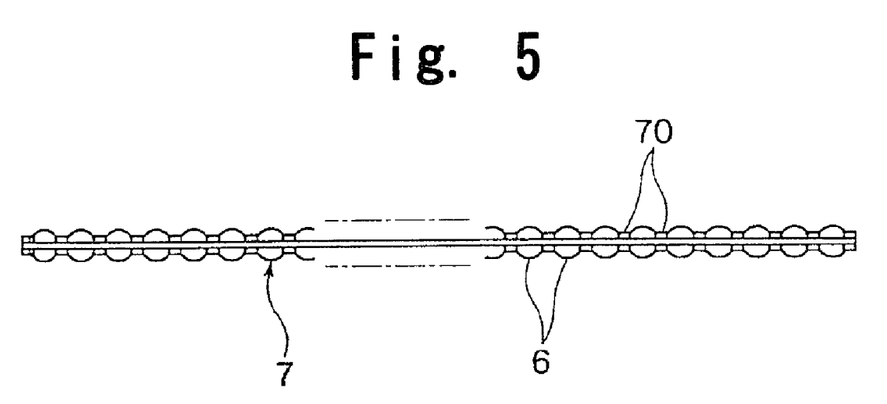
FIG. 5 is a side view showing the spacer belt used for the linear motor actuator shown in FIG. 1.

The balls 6 are arranged at predetermined intervals on a flexible spacer belt 7 made of a synthetic resin as shown in FIGS. 4 and 5. The balls 6 are installed together with the spacer belt 7 in each of the endless circuits of the sliders 3a and 3b. The spacer belt 7 includes spacer portions 70 such that the adjacent balls are spaced apart from each other, thereby preventing the balls 6 from coming into contact with each other while circulating in the endless circuit. Further, between the pair of fore and aft spacer portions 70, there is formed a receiving hole for the ball 6, in which the ball 6 is received. As a result, even when the sliders 3a and 3b are moved in the guide path 12 of the track rail 1 at high speed, a contact sound between the balls in the endless circuit is not generated. Accordingly, generation of the noise involved in the high-speed movement of the sliders 3a and 3b can be suppressed, and serpentine motion of the balls 6 in the endless circuit is prevented, thereby ensuring smooth movement of the sliders 3a and 3b with respect to the track rail 1, by extension, smooth movement of the table structural body 3.

The sliders 3a and 3b structured as described above are arranged in the guide path 12 of the track rail 1 by being sandwiched between the pair of side walls 11 and 11 of the track rail 1 through the intermediation of the balls 6. The balls 6 roll in the ball rolling grooves 13 of the track rail 1, thereby making it possible to reciprocatingly move freely along the longitudinal direction of the track rail 1. In this case, the track rail 1 is formed in the channel-like shape so as to surround the guide path 12, thereby having extremely high rigidity. Further, the table structural body 3 is guided by the pair of sliders 3a and 3b, thereby also having high rigidity with respect to the track rail 1. The table structural body 3 can be reciprocatingly moved along the track rail 1 with high accuracy.

Next, a description will be made of the stator magnets and the mover constituting the linear synchronous motor.

As shown in FIG. 1, the stator magnets 4 are arranged on the stationary base 10 of the track rail 1 and face the guide path 12 in which the sliders 3a and 3b reciprocatingly move. That is, the stationary base 10 functions as a yoke of the stator magnet 4. Each of the stator magnets 4 is made of permanent magnet. N poles and S poles are alternately arranged at a predetermined pitch along the longitudinal direction of the track rail 1. The stator magnets 4 have to be arranged in parallel to the moving direction of the sliders 3a and 3b in the guide path 12 of the track rail 1. On the stationary base 10 of the track rail 1, a concave groove 14 is formed in parallel to the ball rolling grooves 13. The magnetic field magnets 4 are fixed to the track rail 1 so as to be fitted in the concave groove 14.

Figure 6:
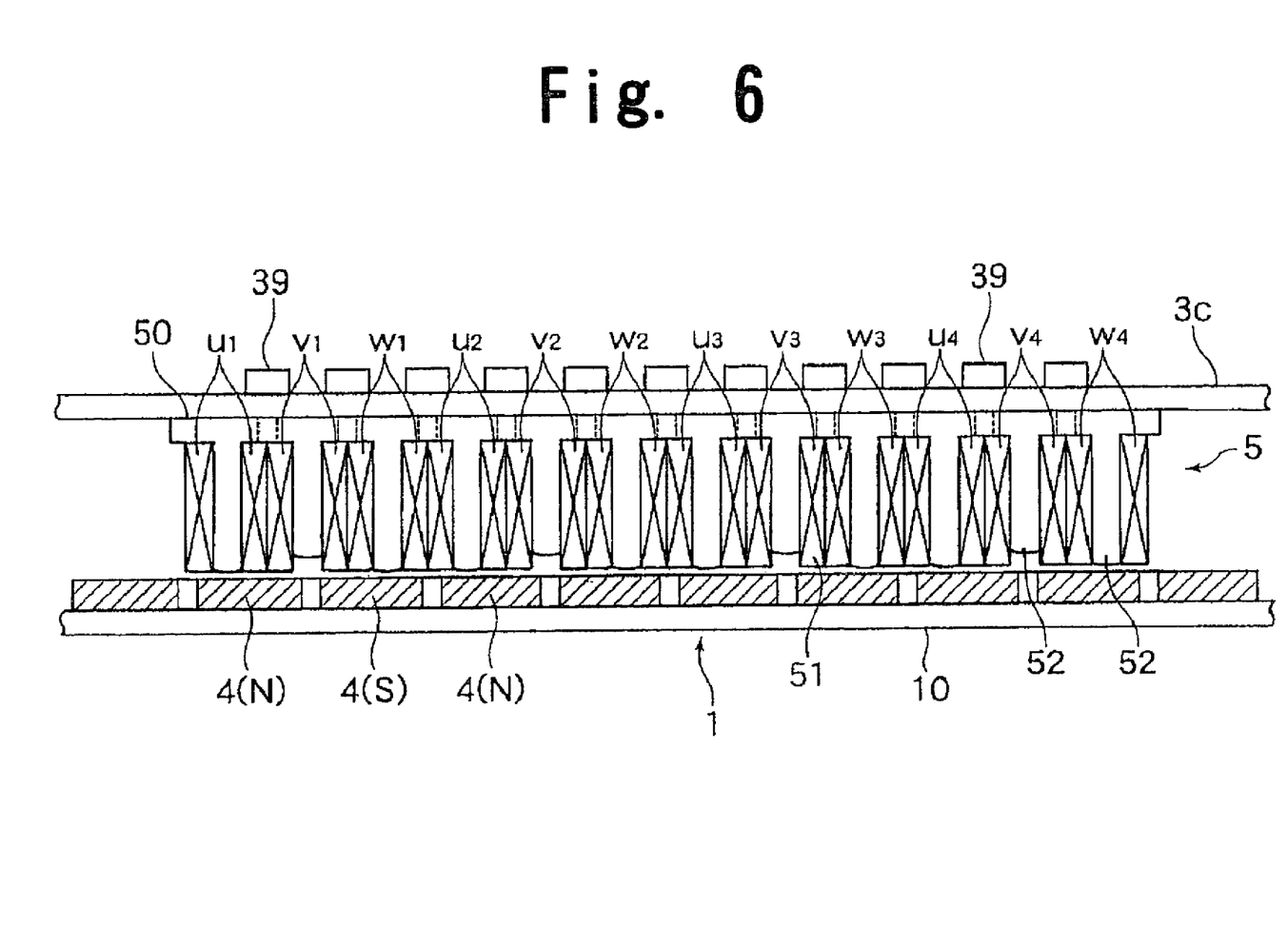
FIG. 6 is a vertical sectional view of a mover and stator magnets of the linear motor actuator shown in FIG. 1, which is taken along the longitudinal direction of the track rail.

On the other hand, FIG. 6 is a vertical sectional view showing a positional relationship between the mover 5 mounted to the table structural body and the stator magnets 4, along the longitudinal direction of the track rail 1. The mover 5 includes a core member 50 fixed to the joint top plate 3c by bolts 39 and a coil 51 wound around the core member 50. The core member 50 is formed with a plurality of slots at a predetermined pitch along the longitudinal direction of the track rail 1, and is formed in a comb-like shape as a whole. The armature core 50 is formed with twelve teeth 52 on front and back sides of which slots are formed. The coil 51 is wound around the teeth 52 of the core member 50 so as to fill the slots. Around the twelve teeth 52, the coil 51 is wound for three phases including $(u_1, u_2, u_3, u_4)$, $(v_1, v_2, v_3, v_4)$, and $(w_1, w_2, w_3, w_4)$. Through the coil 51 of the three phases, a three-phase alternating current of a u phase, a v phase, and a w phase passes, thereby magnetizing the coil 51. As a result, an attractive magnetic force and a repulsive magnetic force are generated between the mover 5 and the stator magnets 4. Accordingly, to the table structural body 3 to which the mover 5 is mounted, a thrust force or a brake force can be applied along the longitudinal direction of the track rail 1. Note that the teeth 52 are formed in uniform width and thickness.

A current applied to the coil 51 wound for the three phases is determined based on a detection signal of a position detection device 8 mounted to the outer side of the track rail 1 (see FIG. 2). To the outer side surface of the side wall portion 11 of the track rail 1, a linear scale 80 on which ladder patterns are repeatedly drawn at a predetermined pitch is fixed. To the joint top plate 3c of the table structural body 3, an encoder 81 for optically reading the ladder patterns of the linear scale 80. While grasping a current position and a current speed of the sliders 3 based on an output signal of the encoder 81, a controller for controlling a variable-frequency supply changes a frequency of the three-phase alternating current depending on a difference between a target position and the current position and a difference between a set speed and the current speed, and, at the same time, allows an alternating current to be supplied to the coil 51 of each of the phases.

As shown in FIG. 6, of the twelve teeth 52 provided to the core member 50, the four teeth around which the coil of the v phase is wound (hereinafter, referred to as "v-phase teeth"), are formed slightly shorter than the teeth around which the coil of the u phase and the w phase are wound (hereinafter, referred to as "u-phase teeth" and "w-phase teeth", respectively). The v-phase teeth are more largely spaced apart from the stator magnets than the u-phase teeth and the w-phase teeth. Conversely, the u-phase teeth and the w-phase teeth protrude toward the stator magnets 4 further than the v-phase teeth.

Figure 7:
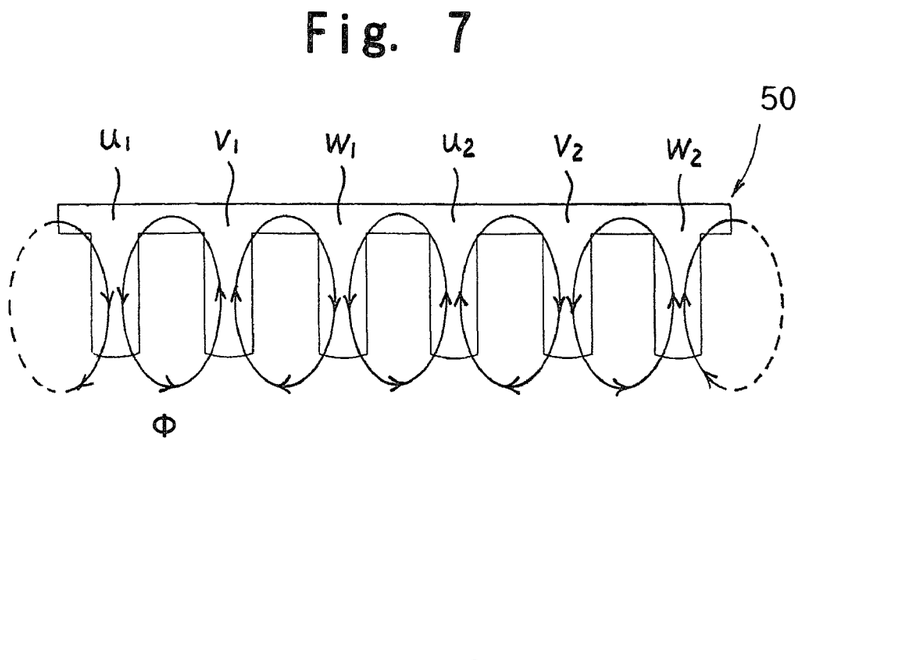
FIG. 7 is a view simply showing a state of magnetic fluxes $\Phi$ passing through teeth of a core member.

A reason only the v-phase teeth of the core member 50 are slightly shorter is, in consideration to a difference between densities of magnetic fluxes passing through the teeth, to substantially equalize densities of magnetic fluxes passing through the teeth between a u-phase teeth group, a v-phase teeth group, and a w-phase teeth group each of which includes the four teeth. FIG. 7 is a view simply showing, by arrows, a state of magnetic fluxes Φ passing through the teeth 52 of the core member 50. For convenience of description, it is assumed that the number of each of the u-phase teeth, the v-phase teeth, and the w-phase teeth is two, that is, the six teeth are formed on the core member 50. Except two teeth ($u_1$ and $w_2$) positioned at both ends of the core member 50, each of the other four teeth ($v_1$, $w_1$, $u_2$, and $v_2$) is provided with other teeth on both adjacent sides thereof. Accordingly, for example, the magnetic flux Φ passing through the $w_1$-phase tooth can pass through the $v_1$-phase and $u_2$-phase teeth on both adjacent sides thereof. However, the $u_1$-phase tooth is adjacent only to the $v_1$-phase tooth, so the magnetic flux Φ passing through the $u_1$-phase tooth passes through the $v_1$-phase tooth, but it is difficult to pass through a region shown by a broken line in the figure. The same is true of the $w_2$-phase tooth. That is, of the six teeth existing on the core member 50, in the two teeth ($v_1$ and $w_1$) positioned on the both ends, the number of the magnetic flux Φ passing therethrough is smaller than that of the rest of four teeth ($v_1$, $w_1$, $u_2$, and $v_2$).

Thus, a comparison between a case where the coil wound around the two u-phase teeth ($u_1$ and $u_2$) is magnetized and a case where the coil wound around the two v-phase teeth ($v_1$ and $v_2$) is magnetized reveals that the magnetic attractive force generated with respect to the stator magnets 4 is larger in the latter. The same is found from a comparison between a case where the coil wound around the two w-phase teeth (w1 and w2) is magnetized and a case where the coil wound around the two v-phase teeth ($v_1$ and $v_2$) is magnetized. As a result, the thrust force generated by the mover 5 involves variation based on a period of the v phase, that is, ripple.

Further, even in a state where electrification is not performed for the coil, because the core member 50 is a ferromagnetic body, the magnetic attractive force is applied between each of the teeth provided to the core member 50 and the stator magnets 4. When the core member 50 is moved in an arrangement direction of the stator magnets 4, there is caused variation in magnetic attractive force due to a correlation between an arrangement pitch of the stator magnets 4 and an arrangement pitch of the teeth of the core member 50, that is, so-called cogging torque. As described above, a comparison between all the u-phase teeth ($u_1$ and $u_2$) and all the w-phase teeth ($w_1$ and $w_2$) reveals that about the same number of the magnetic fluxes pass through those. However, the larger number of the magnetic fluxes pass through the v-phase teeth ($v_1$ and $v_2$) than that through the u-phase teeth ($u_1$ and $u_2$) and the w-phase teeth ($w_1$ and $w_2$). Accordingly, the cogging torque also involves variation due to the existence of the v-phase teeth. Therefore, due to variation in cogging torque, the thrust force of the mover 5 also varies periodically.

However, when the v-phase teeth, through which the magnetic fluxes Φ pass easily, are spaced apart from the stator magnets 4 further than the u-phase and w-phase teeth, it is made more difficult to a corresponding degree for the magnetic fluxes Φ to pass through the v-phase teeth. In a case where the teeth of each of the phases are considered to be a group, the number of the magnetic fluxes Φ passing through the u-phase teeth ($u_1$ and $u_2$), the v-phase teeth ($v_1$ and $v_2$), and the w-phase teeth ($w_1$ and $w_2$) can be made substantially equal to each other. As a result, the variation in thrust force and the variation in the cogging torque based on the period of the v phase can be minimized.

For example, in FIG. 7, when the number of the magnetic flux passing through each of the two teeth ($u_1$ and $w_2$) positioned on both ends of the core member 50 is represented by $\Phi_1$, and the number of the magnetic flux passing through each of the four teeth ($v_1$, $w_1$, $u_2$, and $v_2$) is represented by $\Phi_0$, as obvious from the above-mentioned description, there is obtained a relationship of $\Phi_1 < \Phi_0$. Accordingly, the total number of the magnetic fluxes passing through the u-phase teeth ($u_1$ and $u_2$) is represented by $\Phi_0 + \Phi_1$, and the total number of the magnetic fluxes passing through the w-phase teeth ($v_1$ and $v_2$) is also represented by $\Phi_0 + \Phi_1$. However, the total number of the magnetic fluxes passing through the v-phase teeth ($v_1$ and $v_2$) is represented by $\Phi_0 + \Phi_0$ ($>\Phi_0 + \Phi_1$). In this case, when the v-phase teeth are spaced apart from the stator magnets further than the u-phase and w-phase teeth to adjust the number of the magnetic flux passing through each of the v-phase teeth to $\Phi_2$ ($\Phi_0 > \Phi_2 > \Phi_1$), the total number of the magnetic fluxes passing through the v-phase teeth ($v_1$ and $v_2$) is $\Phi_2 + \Phi_2$. At least a relationship of $\Phi_0 + \Phi_0 > \Phi_2 + \Phi_2$ is obtained, by adjusting a difference between a length of the v-phase teeth and a length of the u-phase and w-phase teeth, it is possible to obtain a relationship of $\Phi_2 + \Phi_2 \approx \Phi_0 + \Phi_1$. By finding such a length of the v-phase teeth, the total number of the magnetic fluxes passing through the u-phase teeth ($u_1$ and $u_2$), the total number of the magnetic fluxes passing through the w-phase teeth ($v_1$ and $v_2$), and the total number of the magnetic fluxes passing through the v-phase teeth ($v_1$ and $v_2$) are made substantially equal to each other, thereby making it possible to suppress the variation in thrust force and the variation in cogging torque based on the period of the v phase.

The number of the magnetic flux passing through each of the teeth of the core member 50 is affected by the width and thickness, a distal end shape, slot intervals, or the like of the teeth. Accordingly, it is necessary to empirically determine the length of the v-phase teeth ($v_1$ and $v_2$) by examinations. When all the u-phase, v-phase, and w-phase teeth are formed under the same conditions, it is necessary that at least the v-phase teeth be spaced apart from the stator magnets 4 further than the u-phase and w-phase teeth. In other words, the u-phase and w-phase teeth have to be closer to the stator magnets 4 than the v-phase teeth.

In a case where the v-phase teeth are made shorter than the u-phase and w-phase teeth, or where the u-phase and w-phase teeth are made longer than the v-phase teeth, it is not necessary to apply the adjustment to every tooth belonging to each phase. As described above, when the total number of the magnetic flux passing through the teeth of each phase is substantially the same, the variation in thrust force based on the period of the v phase can be suppressed. For example, with only a certain tooth of the v phase being made shorter and only certain u-phase and w-phase teeth being made longer, it is possible to adjust the total number of the magnetic fluxes.

Note that, FIG. 7 illustrates a case where the six teeth are formed on the core member 50, but it is also possible to think in the same way in a case where the twelve teeth 52 are formed as shown in FIG. 6. By making the v-phase teeth be spaced apart from the stator magnets 4 further than the u-phase and w-phase teeth, the variation in thrust force and the variation in cogging torque based on the period of the v phase can be suppressed.

Further, the above description includes the example in which the three-phase alternating current passes through the coil. However, the present invention can be widely applied not only to the linear motor employing the three-phase alternating current but also to the one employing alternating currents of a plurality of phases ($x_1, x_2, \ldots, x_n$). In this case, the core member of the mover includes teeth the number of which is a whole-number multiple of the number of phases n of the alternating current. When the phases of the corresponding alternating currents of the two teeth positioned at the both ends of the core member are represented by x1 and xn, distal ends of the teeth corresponding to the other phases ($x_2, x_3, \ldots, x_{n-1}$) are spaced apart from the stator magnets further than distal ends of the above-mentioned two teeth. As a result, it is possible to suppress the variation in thrust force and the variation in cogging torque. Note that, as the number of phases of the alternating current increases, the difference in length of the teeth decreases. This is because it is conceived that as the total number of teeth provided to the core member increases, an effect of the two teeth positioned at the both ends of the core member applied to the total number of the magnetic fluxes is reduced.

Figure 8:
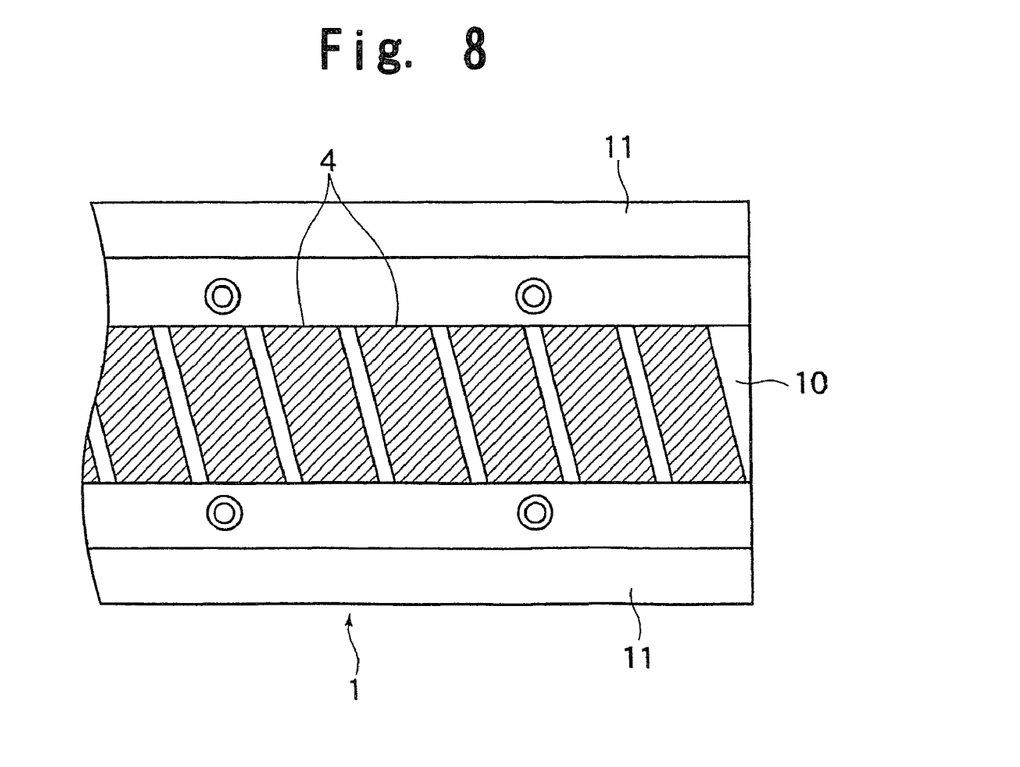
FIG. 8 is a plan view showing another example of an arrangement mode of the stator magnets on the track rail.

FIG. 8 shows another example of an arrangement of stator magnets 4 on the stationary base 10 of the track rail 1. In the example shown in FIG. 1, the N poles and the S poles of the stator magnets 4 are simply arranged alternately along the longitudinal direction of the track rail 1. A boundary between the N poles and the S poles are in parallel to the width direction of the track rail 1 (right and left direction of a plane of FIG. 2). However, in the example shown in FIG. 8, the N poles and the S poles of the stator magnets 4 are formed in parallelograms, and the boundary between the N poles and the S poles are inclined with respect to the width direction of the track rail 1. That is, when the teeth 52 of the core member 50 advances in the longitudinal direction of the track rail 1, magnetic poles of the stator magnets 4 facing the teeth 52 change from the N poles to the S poles or the S poles to the N poles not suddenly but gradually. In this way, in the case where the boundary of each of the magnetic poles is inclined with respect to the width direction of the track rail 1, the variation in magnetic attractive force due to the correlation between the arrangement pitches of the stator magnets 4 and the arrangement pitches of the teeth of the core member 50, that is, the variation in cogging torque can be reduced, thereby making it possible to reduce the ripple of the thrust force of the mover 5.

Figure 9:
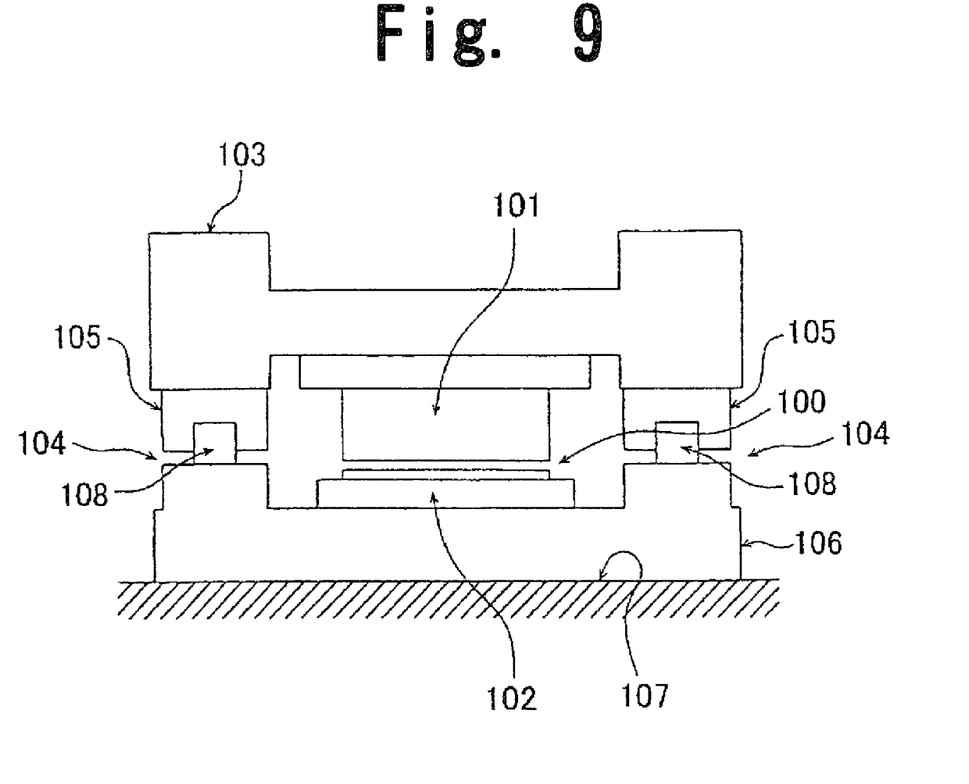
FIG. 9 is a schematic view showing a linear motor actuator according to another embodiment, to which the linear synchronous motor of the present invention is applied.

In the linear motor actuator shown in FIG. 1, in the guide path provided to the track rail of the channel-like shape, between the pair of sliders 3a and 3b moving forward and backward, the mover of the linear synchronous motor is mounted. However, a use mode of the linear motor according to the present invention is not limited to this. FIG. 9 shows a linear motor actuator according to another mode, which is formed by using the linear synchronous motor of the present invention. The linear motor actuator includes a base 106 mounted on a stationary portion 107 such as a bed of a mechanical device, a linear guide device 104 having two shafts arranged in parallel to each other on the base 106, a movable table 103 movably provided on the base through intermediation of the linear guide device 104, and a linear synchronous motor 100 provided between the base 106 and the movable table 103. The linear guide device 104 includes track rails 108 fixed to the base 106 and slide members 105 fixed to the movable table 103 and reciprocatingly movable along the track rails 108. The linear synchronous motor 100 includes a mover 101 and stator magnets 102, the stator magnets 102 being arranged on the base 106 along a moving direction of the movable table 103, the mover 101 being suspended from the movable table 103 so as to keep a predetermined interval from the stator magnet 102. A structure of the mover 101 is completely the same as the structure of the mover 5 shown in FIG. 6.

Also in the linear motor actuator of this structure, by adjusting the lengths of the teeth of the core member of the mover 101 in the above-mentioned manner of the present invention, variation in thrust force and variation in cogging torque based on the v-phase period of the alternating current can be minimized.

The invention claimed is:

1. A linear synchronous motor comprising:
   a first member in which N poles and S poles are alternately arranged linearly, for generating a magnetic field; and
   a second member which is opposed to the first member at an interval therefrom, and which generates a shifting magnetic field along an arrangement direction of the magnetic poles along with passage of alternating currents of a plurality of phases, for applying a thrust force to the first member, wherein
   the second member comprises a core member in which teeth, a number of which is more than twice a number of phases of the alternating currents, are arranged, and a coil which is wound around the teeth of the core member and through which the alternating current of any one of the phases passes, and
   the alternating current is a three-phase alternating current of a u phase, a v phase, and a w phase; the u-phase passes through the coil wound around the tooth at one end of the core member; the w phase passes through the coil wound around the tooth at another end of the core member; and a distal end of the tooth around which the coil of the v phase is wound is spaced apart from the first member further than distal ends of the teeth around which the coil of the u phase and the w phase is wound.

2. A linear motor actuator, comprising:
   a track rail having a stator magnet in which N poles and S poles are alternately arranged along a longitudinal direction;
   sliders reciprocatingly movable along the track rail; and
   a mover mounted to the sliders with an interval retained from the stator magnet of the track rail, and which generates a shifting magnetic field along the longitudinal direction of the track rail along with passage of alternating currents of a plurality of phases to apply a thrust force to the track rail, wherein
   the mover comprises a core member, in which teeth a number of which is more than twice a number of phases of the alternating currents are arranged, and a coil which is wound around the teeth of the core member and through which the alternating current of any one of the phases passes, and
   the alternating current is a three-phase alternating current of a u phase, a v phase, and a w phase; the u-phase passes through the coil wound around the tooth at one end of the core member; the w phase passes through the coil wound around the tooth at another end of the core member; and a distal end of the tooth around which the coil of the v phase is wound is spaced apart from the track rail further than distal ends of the teeth around which the coil of the u phase and the w phase is wound.

3. A linear motor actuator according to claim 2, wherein each of the magnetic poles constituting the stator magnet is arranged at an inclination with respect to the longitudinal direction of the track rail.

* * * * *